US005692575A

United States Patent [19]
Hellström

[11] Patent Number: 5,692,575
[45] Date of Patent: Dec. 2, 1997

[54] REVERSIBLE POWER WRENCH

[75] Inventor: Tore Gunnar Hellström, Enebyberg, Sweden

[73] Assignee: Atlas Copco Tools AB, Nacka, Sweden

[21] Appl. No.: 550,582

[22] Filed: Oct. 31, 1995

[30] Foreign Application Priority Data

Oct. 31, 1994 [SE] Sweden .................................. 9403711

[51] Int. Cl.⁶ .............................. B25F 5/00; B25B 21/00
[52] U.S. Cl. ............................ 173/216; 173/47; 173/217; 475/290; 475/299
[58] Field of Search ........................ 173/47, 48, 216, 173/217; 475/290, 299

[56] References Cited

U.S. PATENT DOCUMENTS

| | | |
|---|---|---|
| 2,046,412 | 7/1936 | Reynolds . |
| 4,255,987 | 3/1981 | Ciolli .................................... 475/290 |
| 4,274,304 | 6/1981 | Curtiss . |
| 4,364,286 | 12/1982 | Ciolli . |
| 4,573,370 | 3/1986 | Clemens . |

*Primary Examiner*—Joseph J. Hail, III
*Assistant Examiner*—Jay A. Stelacone
*Attorney, Agent, or Firm*—Frishauf, Holtz, Goodman, Langer & Chick

[57] ABSTRACT

A reversible power wrench includes a housing (10), a rotation motor, and a power transmission coupling the motor to an output shaft (21), and further includes a reduction gearing (20) with first planetary gearing (28) for transferring torque in the "forward" direction of rotation and a second planetary gearing (29) for transferring torque in the "reverse" direction of rotation. The first and second planetary gearings (28, 29) have rotationally interconnected sun gears (31, 39) and a common planet wheel carrier (34). The second planetary gearing (29) includes an inner set of planet wheels (37) intermeshing with the sun gear (39) and an outer set of planet wheels (38) intermeshing with the inner set of planet wheels (37) and engageable with a ring gear (40) which is axially shiftable between an "forward" position in which it engages the planet wheels (33) of the first planetary gearing (28) only and a "reverse" position in which it engages the outer sets of planet wheels (38) of the second planetary gearing (29) only. Speed responsive centrifugal weights (46) prevent by positive locking the ring gear (40) from being shifted during operation of the power wrench.

18 Claims, 3 Drawing Sheets

REVERSIBLE POWER WRENCH

BACKGROUND OF THE INVENTION

This invention relates to a reversible power wrench of the type having a housing, a rotation motor and a power transmission coupling the motor to an output shaft, wherein the power transmission comprises a reduction gearing which is shiftable for alternative directions of rotation of the output shaft.

The most common way of obtaining reversability of a pneumatic power wrench is simply to reverse the drive motor. A problem concerned with pneumatic vane-type motors, which is the most suitable type of motor for power wrenches, is that such motors usually have a considerably less power output in the reverse direction of rotation than in the normal forward direction. This is due to nonsymmetric locations of the air communication ports in the motor, the purpose of which is to obtain a high as possible power output of the motor in the forward direction of rotation.

In order to get a higher power output in the reverse direction, some previously known pneumatic power wrenches have been provided with symmetrically designed vane type motors. That is a compromise which results in a lower power output in the forward direction of rotation. Owing to the lower power output, a bigger motor has to be used to get the same power output in the forward direction as for an optimized non-symmetric motor. This results in a bulkier and heavier tool and a higher pressure air consumption.

A particular problem to accomplish alternative directions of rotation exists with respect to twin motor powered wrenches, like the one described in U.S. Pat. No. 4,484,871. Due to the fact that the power transmission comprises a one-way clutch, the motors in this type of tool are not reversible.

One way to accomplish a reversible pneumatic power wrench is to use a reversing gearing by which the direction of rotation is shiftable without changing the direction of rotation of the motor. This means that an optimized non-symmetric vane type motor can be used for obtaining a high power output in both directions of rotation.

The employment of a reversing gearing also solves the problem of how to accomplish a change of rotation direction at twin motor wrenches of the type described in the above mentioned U.S. Pat. No. 4,484,871.

A reversing gearing for a power wrench in the form of an attachment unit is previously described in U.S. Pat. No. 2,780,944.

SUMMARY OF THE INVENTION

The primary object of the invention is to provide a pneumatic power wrench having a power transmission with a combined reduction and a reversing gearing which is shiftable between a "forward" condition and a "reverse" condition, and which is compact and simple in structure and easy to operate.

Another object of the invention is to provide a reversible power wrench having a reversing gearing with a speed responsive safety lock which permits shifting of the gearing between its "forward" condition and its "reverse" condition at rotation speeds below a certain level only.

Further characteristics and advantages of the invention will appear from the following description in which a preferred embodiment of the invention is described in detail with reference to the accompanying drawings.

DETAILED DESCRIPTION

Figure 1:
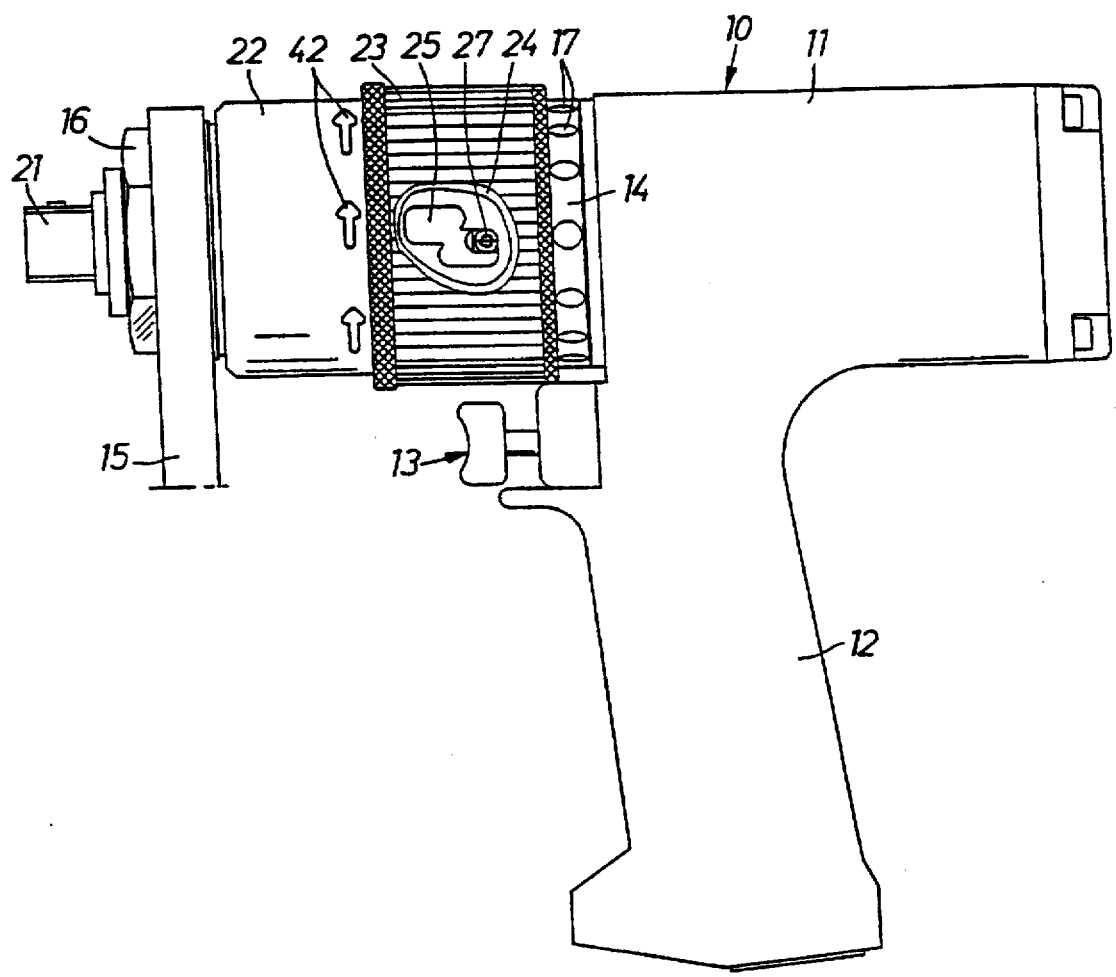
FIG. 1 shows a partly broken side view of a power wrench according to the invention.

The power wrench shown on the drawings comprises a housing 10 including a main section 11 formed with a pistol grip handle 12. The main section 11 of the housing 10 encloses a pneumatic drive unit in the form of two vane motors (not shown).

The motors are supplied with pressure air via an inlet passage extending through the handle 12, and a throttle valve 13.

The housing 10 also comprises a forward casing 14 which encloses a power transmission and which is swivelled relative to the main section 11. A reaction support bar 15 is firmly secured to the casing 14 by a nut 16. The casing 14 is arrestable in anyone of a number of angular positions defined by indentations 17 located around the rear periphery of the casing 14. These indentations 17 are arranged to be engaged by a latch mechanism (not shown) operably coupled to the throttle valve 13.

This type of swivel and latch arrangement is previously known and described in detail in the above mentioned U.S. Pat. No. 4,484,871.

In the transmission casing 14, there is located a reduction gearing 20 which is shiftable for obtaining alternative directions of rotation of an output shaft 21. The output shaft 21 is square ended for receiving a standard type nut socket.

In FIG. 1, there is illustrated a manoeuver means in the form of a tubular grip element 23 which is axially displaceable on a tubular sleeve 22 which is mounted on the casing 14 and axially locked by a lock ring 19. The grip element 23 is connected to the reduction gearing 20 inside the casing 14. For the purpose of illustration, the grip element 23 is shown in FIG. 1 with a broken-away portion 24 through which is visible one of three identical Z-shaped apertures 25 in the casing 14. These apertures 25, which are covered by the grip element 23, form a guiding means for three radial pins 27 connecting the grip element 23 to the reduction gearing 20 inside the casing 14. The apertures 25 and the radial pins 27 are equally distributed along the circumference of the casing 14 and ring gear 40, respectively. The functional features of the pins 27 and apertures 25 will be described in further detail below.

As shown in FIGS. 2–5, the reduction gearing 20 comprises a first planetary gearing 28 and a second planetary gearing 29, whereof the first planetary gearing 28 is intended to accomplish a speed reduction in the "forward" direction and the second planetary gearing 29 in the "reverse" direction.

As used herein, the expression "forward" means the main or predominant direction of rotation in which the wrench is intended to rotate for performing its main task, namely to tighten screw joints. In almost all cases this means a clockwise rotation.

As used herein, "reverse" rotation, it is accordingly means the direction of rotation opposite to the "forward" direction, usually the anticlockwise direction.

The first planetary gearing 28 comprises a sun gear 31 cut directly in a drive spindle 32. The latter is connected to the drive unit and supplies high speed rotational power to the reduction gearing 20. The first planetary gearing 28 further comprises three planet wheels 33 which are rotatively journalled on stub axles 30 mounted on a planet wheel carrier 34. The planet wheels 33 intermesh with the sun gear 31.

The planet wheel carrier 34 is rigidly interconnected with a transmission shaft 35 by which the rotational power is transferred to the output shaft 21, directly or via a further speed reducing gearing. (Not shown).

Moreover, the planet wheel carrier 34 is common for both of the two planetary gearings 28, 29 and, accordingly, forms a support means for the planet wheels of the second planetary gearing 29. These planet wheels comprise an inner set of planet wheels 37 and an outer set planet wheels 38.

The inner sets of wheels 37 are journalled on stub axles 36a and intermesh both with a sun gear 39 and the outer set of wheels 38, whereas the outer set of wheels 38 are journalled on stub axles 36b and intermesh with the inner set of wheels 37 as well as with an axially shiftable ring gear 40.

The sun gear 39 is not only rotatively interconnected with the sun gear 31 of the first planetary gearing 28, it is in fact cut in the same shaft, namely the drive spindle 32. However, the sun gear 39 has fewer teeth than the sun gear 31.

The ring gear 40 is shiftably guided in the casing 14 between a "forward" position and a "reverse" position, and a spring 41 exerts a biassing force on the ring gear 40 towards the "forward" position. The spring 41 is disposed on the outside of the casing 14 and is covered by the sleeve 22 which forms an axial support for the spring 41.

Figure 2:
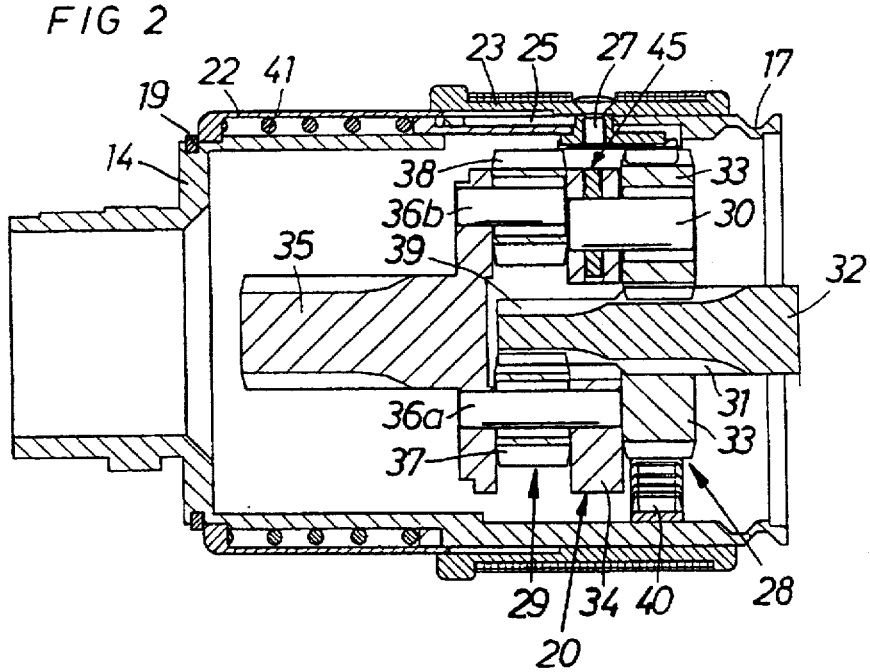
FIG. 2 shows a longitudinal section through the reversing gearing, illustrating the "forward" condition.

When occupying its "forward" position, the ring gear 40 engages the planet wheels 33 of the first planetary gearing 28. This position is illustrated in FIG. 2. The ring gear 40 is locked against rotation relative to the casing 14 by means of the three radial pins 27 extending through the apertures 25 in the casing 14, which means that the reaction torque from the planet wheels 33 is transferred to the casing 14. This means in turn that a driving torque is transferred to the planet wheel carrier 34 and to the transmission shaft 35. A clockwise rotation of the drive spindle 32 results in a clockwise rotation of the transmission shaft 35.

Figure 3:
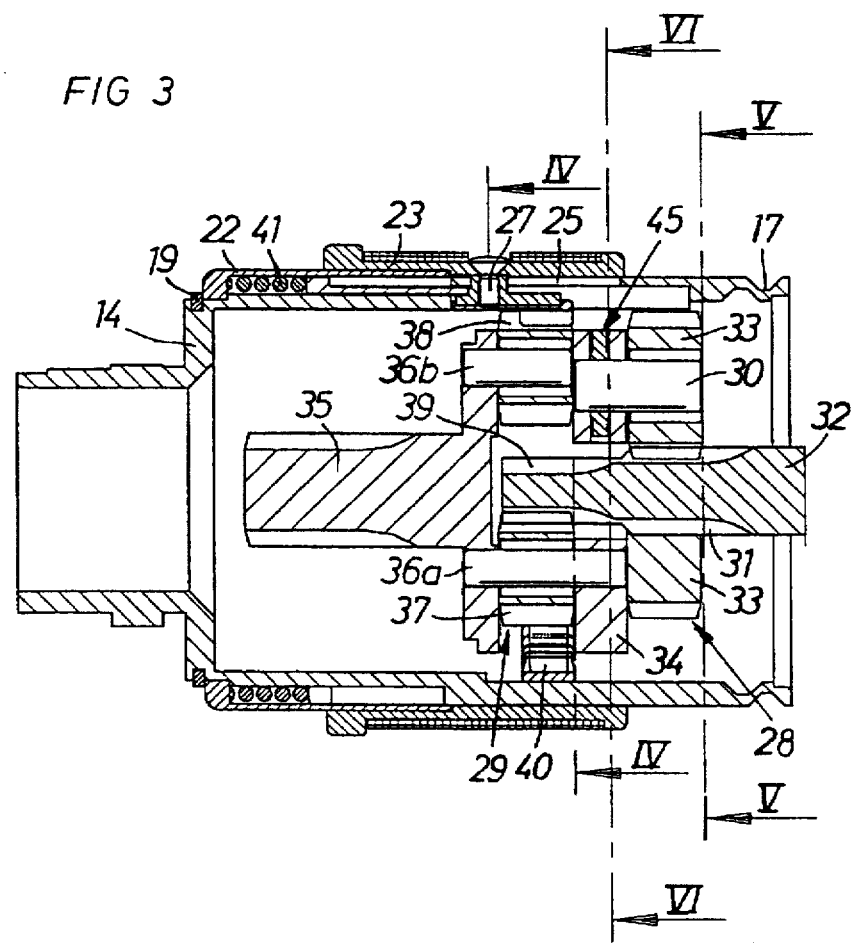
FIG. 3 is a view similar to FIG. 2, but illustrates the "reverse" condition of the gearing.
Figure 4:
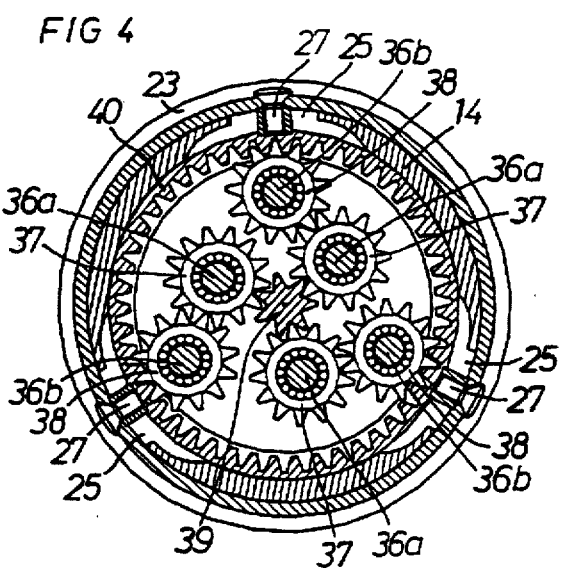
FIG. 4 shows a cross section along line IV—IV in FIG. 3.
Figure 5:
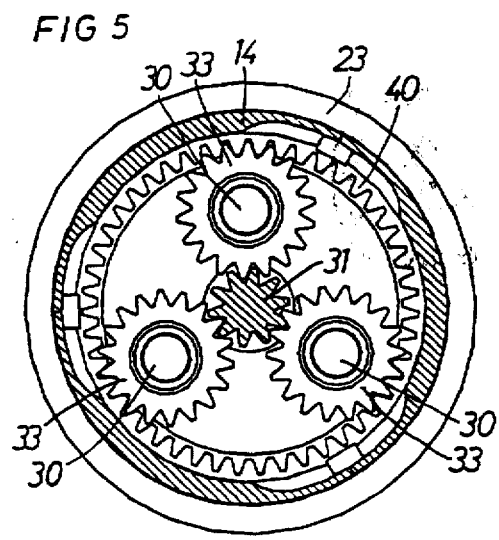
FIG. 5 shows a cross section along line V—V in FIG. 3.

In its "reverse" position, illustrated in FIG. 3, the ring gear 40 engages the outer planet wheels 38 of the second planetary gearing 29, and because the outer planet wheels 38 engage the inner planet wheels 37 instead of the sun gear 39, the reaction torque transferred to the ring gear 40 as well as the direction of rotation of the planet wheel carrier 34 is directed oppositely compared to the "forward" condition. In other words, the transmission shaft 35 now rotates in the "reverse" direction.

As illustrated in FIGS. 1 and 2, the grip element 23 occupies its rearmost position on the casing 14 as the ring gear 40 is in its "forward" position, and to indicate the actual direction of rotation a row of arrows 42 depicted on the sleeve 22 is uncovered by the grip element 23. See FIG. 1.

Through the broken-away portion 24 of the grip element 23 in FIG. 1, it is to be seen that the radial pins 27 occupies its rearmost positions relative to the Z-shaped apertures 25. In order to shift the gearing from "forward" to "reverse" condition, the grip element 23 is displaced forwardly on the casing 14, against the bias force of spring 41. Depending on the particular shape of the apertures 25, the grip element 23 has to be rotated a certain angle to make the pins 27 enter the forwardmost parts of the apertures 25 and, thereby, allow the ring gear 40 to be displaced fully into its "reverse" position.

Due to the continuous action of the bias spring 41 the grip element 23 and the ring gear 40 has to be manually maintained in the "reverse" position. As the manual shifting force applied on the grip element 23 is discontinued, the spring 41 returns automatically the ring gear 40 to its central free running position in which the pins 27 rest against the transverse portions of the Z-shaped apertures 25.

As the ring gear 40 is shifted forwardly relative to the casing 14 to occupy its "reverse" position, the grip element 23 covers the arrows 42 but uncovers on its other side another row of arrows (not illustrated) pointing in the opposite direction to indicate the actual direction of rotation.

Since the transmission casing 14 is swivelled to the main section 11 of the housing 10 to enable any suitable support position of the reaction support bar 15, the direction indicating arrows 42 as well as the nonillustrated oppositely directed arrows are disposed around the entire circumference of the sleeve 22 to be visible at all times.

An important feature of the reduction gearing 20 as described above is that the axial distance between the planet wheels 33 of the first planetary gearing 28 and the outer planet wheels 38 of the second planetary gearing 29 is equal to or larger than the axial extent of the ring gear 40. This means that when occupying a central position, defined by the transverse portions of the Z-shaped apertures 25, the ring gear 40 is out of engagement with both the first planetary gearing 28 and the second planetary gearing 29. This central position of the ring gear 40 provides a free running condition which ensures that no dead lock condition of the reduction gearing 20 may occur.

Figure 6:
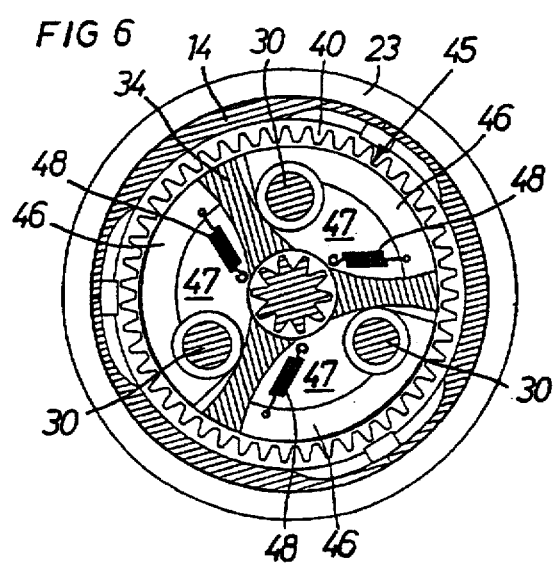
FIG. 6 shows a cross section along line VI—VI in FIG. 3, illustrating the safety lock means in an inactive condition.
Figure 7:
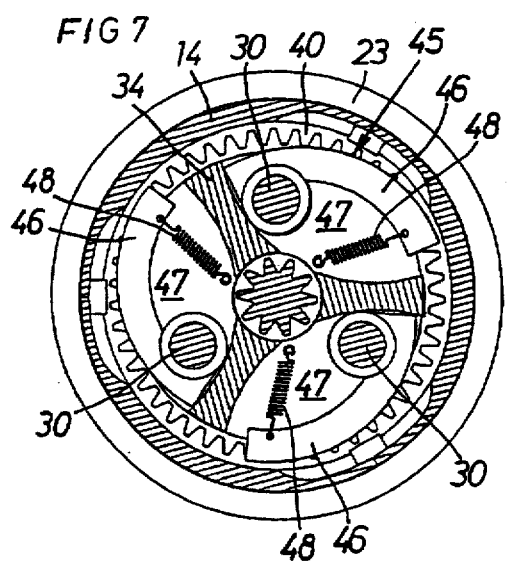
FIG. 7 shows the same cross section as in FIG. 6, but illustrates the safety lock means in an active condition.

In FIGS. 6 and 7, there is illustrated a safety lock means 45 by which unintentional gear shifting during tool operation is prevented. A shifting of the direction of rotation during operation of the wrench would be hazardous to the operator, because the reaction support bar 15, which originally has been located so as to take support against a fixed structure adjacent the screw joint being tightened, would in case of a sudden change in direction of rotation swing freely until it hits another fixed structure. Such a swinging movement of the reaction support bar 15 may cause damage to the equipment and workpiece and injure the operator.

In order to eliminate this safety risk, there is provided a speed responsive lock means 45 by which shifting of the ring gear 40 is prevented during operation of the wrench. This lock means 45 comprises three arc-shaped centrifugal weights 46 each of which is pivotally supported on one of the stub axles 30 and located in a pocket 47 in the planet wheel carrier 34. The centrifugal weights 46 are pivotable between inner inactive positions, as illustrated in FIG. 6, and outer active lock positions. See FIG. 7. Springs 48 bias the centrifugal weights 46 toward their inactive positions. In their active lock positions, which are attained at a certain rotation speed of the reduction gearing 20, the centrifugal weights 46 form a lock means for positively blocking the ring gear 40 against displacement from either of its "forward" or "reverse" positions.

It is to be understood that the above described device is just a preferrable example and that the scope of the present invention includes all embodiments within the scope of the claims.

I claim:

1. A power wrench comprising a housing, a rotation motor, and a power transmission coupling said motor to an output shaft, wherein:
   said power transmission includes a reduction gearing shiftable between alternative directions of rotation of said output shaft,
   said reduction gearing comprises a first planetary gearing engagable for power transmission in a forward direction, and a second planetary gearing engagable for power transmission in a reverse direction,
   said first planetary gearing includes a sun gear and planet wheels arranged to intermesh with said sun gear of said first planetary gearing,
   said second planetary gearing includes a sun gear, an inner set of planet wheels arranged to intermesh with said sun gear of said second planetary gearing, and an outer set of planet wheels arranged to intermesh with said inner set of planet wheels,
   said sun gear of said first planetary gearing is rotationally interconnected with said sun gear of said second planetary gearing,
   said planet wheels of said first planetary gearing and said inner set and outer set of planet wheels of said second planetary gearing are journalled on a common planet wheel carrier, and
   wherein said power wrench further comprises a ring gear axially shiftable in said housing between a forward position in which said ring gear engages only said planet wheels of said first planetary gearing, and a reverse position in which said ring gear engages only said outer set of planet wheels of said second planetary gearing.

2. The power wrench according to claim 1, wherein said sun wheel of said first planetary gearing and said sun wheel of said second planetary gearing are integrally formed in one piece.

3. The power wrench according to claim 2, further comprising maneuver means movably guidable on said housing for shifting said ring gear between said forward and reverse positions, and an urging member arranged to exert a bias force on said ring gear toward said forward position.

4. The power wrench according to claim 3, wherein said maneuver means comprises a grip element which is axially shiftable as well as rotatable relative to said housing, and interacting stop means for enabling axial shifting of said ring gear from said forward position to said reverse position and vice versa responsive to a predetermined angular displacement of said grip element.

5. The power wrench according to claim 4, wherein said stop means defines an axial position of said ring gear in which said ring gear occupies a neutral unengaged position between said planet wheels of said first planetary gearing and said outer set of planet wheels of said second planetary gearing.

6. The power wrench according to claim 2, further comprising a speed responsive lock means for preventing axial displacement of said ring gear at rotation speeds of said reduction gearing above a predetermined level.

7. The power wrench according to claim 6, wherein said lock means comprises at least one centrifugal weight pivotally mounted on said planet wheel carrier for movement between an inner inactive position and an outer lock position, and an urging member connected to said at least one centrifugal weight for biasing said at least one centrifugal weight toward said inner inactive position.

8. The power wrench according to claim 1, wherein said planet wheels of said first planetary gearing are axially spaced from said outer set of planet wheels of said second planetary gearing by a predetermined distance, and said ring gear has an axial extent equal to or smaller than said predetermined distance in order to avoid double engagement and dead locking of said reduction gearing.

9. The power wrench according to claim 8, further comprising maneuver means movably guidable on said housing for shifting said ring gear between said forward and reverse positions, and an urging member arranged to exert a bias force on said ring gear toward said forward position.

10. The power wrench according to claim 9, wherein said maneuver means comprises a grip element which is axially shiftable as well as rotatable relative to said housing, and interacting stop means for enabling axial shifting of said ring gear from said forward position to said reverse position and vice versa responsive to a predetermined angular displacement of said grip element.

11. The power wrench according to claim 10, wherein said stop means defines an axial position of said ring gear in which said ring gear occupies a neutral unengaged position between said planet wheels of said first planetary gearing and said outer set of planet wheels of said second planetary gearing.

12. The power wrench according to claim 8, further comprising a speed responsive lock means for preventing axial displacement of said ring gear at rotation speeds of said reduction gearing above a predetermined level.

13. The power wrench according to claim 12, wherein said lock means comprises at least one centrifugal weight pivotally mounted on said planet wheel carrier for movement between an inner inactive position and an outer lock position, and an urging member connected to said at least one centrifugal weight for biasing said at least one centrifugal weight toward said inner inactive position.

14. The power wrench according to claim 1, further comprising maneuver means movably guidable on said housing for shifting said ring gear between said forward and reverse positions, and an urging member arranged to exert a bias force on said ring gear toward said forward position.

15. The power wrench according to claim 14, wherein said maneuver means comprises a grip element which is axially shiftable as well as rotatable relative to said housing, and interacting stop means for enabling axial shifting of said ring gear from said forward position to said reverse position and vice versa responsive to a predetermined angular displacement of said grip element.

16. The power wrench according to claim 15, wherein said stop means defines an axial position of said ring gear in which said ring gear occupies a neutral unengaged position between said planet wheels of said first planetary gearing and said outer set of planet wheels of said second planetary gearing.

17. The power wrench according to claim 1, further comprising a speed responsive lock means for preventing axial displacement of said ring gear at rotation speeds of said reduction gearing above a predetermined level.

18. The power wrench according to claim 17, wherein said lock means comprises at least one centrifugal weight pivotally mounted on said planet wheel carrier for movement between an inner inactive position and an outer lock position, and an urging member connected to said at least one centrifugal weight for biasing said at least one centrifugal weight toward said inner inactive position.

* * * * *